United States Patent Office 2,996,546
Patented Aug. 15, 1961

2,996,546
METHOD OF PURIFYING BENZIDINES
Adnan A. R. Sayigh, West Haven, Conn., assignor to The Carwin Company, North Haven, Conn., a corporation of Connecticut
No Drawing. Filed Jan. 14, 1958, Ser. No. 708,953
9 Claims. (Cl. 260—571)

This invention relates to a method of purifying benzidines.

Benzidines, the term as used herein includes not only benzidine itself but substitution products thereof, are frequently used in the manufacture of certain dyes, and as dye intermediates their purity is of a high degree of importance in the manufacture of acceptable products. One of the most common ways of producing benzidines is to heat hydrazobenzenes or ortho or meta substitution products thereof in the presence of mineral acids to effectuate a "benzidine rearrangement," in which the two benzene rings become inverted and join at the para carbon atoms to produce a diphenyl group. The hydrazo group disappears and the nitrogen atoms become amino groups in the para and para prime positions on the diphenyl. Generally, if the original hydrazobenzene contains ring substituents, the benzidine produced therefrom will contain the same substituent on each of the two benzene rings symmetrically arranged, since it appears that during the rearrangement, the reacting units or groups prefer to unite with like groups. Hence, the products of the benzidine rearrangement are generally symmetrical in structure. Inasmuch as the benzidine rearrangement is carried out in the presence of a mineral acid, the product is found in the form of a mineral acid salt of the benzidine.

Although the formation of symmetrically substituted benzidines is favored during the rearrangement, there frequently are impurities present in the benzidine product, and such impurities are troublesome for a number of reasons. In the first place, the original hydrazobenzene may be relatively impure, having been produced by the reduction of nitrobenzene, and such impurities will be carried over into the benzidine product. In the second place, small quantities of impurities are produced during the rearrangement itself and these impurities, even though they may be present in small amounts, are troublesome because of the stringent requirements of purity that are imposed upon dye intermediates, and because they are very difficult to remove by ordinary techniques.

An object of the invention is to provide an improved method of purifying an impure benzidine.

Another object of the invention is to remove impurities from an impure benzidine which is produced by the benzidine rearrangement.

Other objects and advantages of the invention will appear hereinafter.

According to the invention, an impure benzidine salt, such as one that has been produced by the benzidine rearrangement, is washed with an aqueous solution of an organic polar solvent in an amount sufficient to remove the impurities from the benzidine salt. A convenient index of polarity is water solubility, and for the purposes of the present invention, solvents having a satisfactorily high degree of polarity are those which are either miscible with water or soluble at least to the extent of 30 parts by weight in 100 parts of water. Preferred solvents are the low molecular weight alcohols, i.e., having 1 to 4 carbon atoms such as isopropyl alcohol, the low molecular weight (1 to 4 carbon atoms) carboxylic acids, and the low molecular weight ketones of which acetone is a preferred example. Dioxane, an ether, is another polar solvent which may be used. In order to simplify the operation from the standpoint of fire and explosion hazard and solvent recovery, not more than about 50 parts by weight of organic solvent per 50 parts of water in the washing solution should be used, preferably not more than about 20 parts per 80 parts of water. Relatively dilute aqueous solutions are effective. However, it is preferred that the amount of organic polar solvent in the aqueous solution be at least about 3 parts to 97 parts of water.

The total amount of washing liquid needed to remove the impurities will generally depend upon the particular type of benzidine, the type of organic solvent and its concentration, and other factors and variables in the process. Hence, in practicing the invention, the washing is continued until the desired degree of purification is achieved.

The benzidines which may be purified in the form of their salts according to the present invention, are those which correspond to the following structural formula:

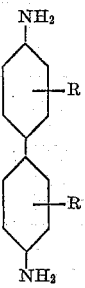

wherein the radical R may be hydrogen, an alkoxy group having 1 to 4 carbon atoms, halogen or an alkyl group having 1 to 4 carbon atoms. In each case it is preferred that the molecule be symmetrical in that any substituent that appears on one of the benzene rings also appears on the other and in the same position, i.e., ortho or meta. For example, o,o' dihalogen, and m,m' dimethoxy substitution products of benzidine may be purified. Benzidines for which the process of the invention has been found to be of particular utility in purification include dichlorobenzidine and dianisidine, because these materials generally have small amounts of residual impurities that are very difficult to eliminate by washing with aqueous solutions of salts at any pH on the acid side.

In washing the benzidine salt with the organic polar solvent, the washing material is preferably kept on the acid side. This may be done by adding a small amount of an inorganic acid, such as hydrochloric acid, thereto.

The effectiveness of the aqueous organic solvent wash is demonstrated eventually in the purity of the dye that is formed from a particular benzidine or benzidine derivative. That is from 3,3'-dichlorobenzidine, benzidine yellow pigment, prototype 518, New Color Index No. 21090 may be formed. A high quality intermediate is needed to produce a light mass tone which is desired. From m,m'-dimethoxybenzidine i.e. dianisidine, Benzo Copper Blue B may be formed, which requires a pure intermediate. In each case a particular dye prepared from the benzidine derivatives which had been purified by the procedure of the present invention, exhibits a better and more acceptable color as compared with dye prepared from the particular benzidine which had been washed only with aqueous acidified salt solution.

A convenient way of making a quick evaluation of the effectiveness of any given washing procedure, to avoid the somewhat laborious and expensive operation of preparing the dye from the benzidine and observing its qualities, is to evaluate the color of the washing liquid that is removed from the filter cake. Acidified water or acidified aqueous salt solution frequently will produce a washing effluent which has little or no color, as compared with a more highly colored effluent from an aqueous alcohol wash. The presence of the color in the wash is indicative of the removal of impurity by the aqueous alcohol solution. Another way of evaluating the effectiveness of the purification is to measure the loss from the product by the washing treatment. In many instances when using a salt wash, the loss of material from the cake will be small or negligible indicating little or no removal of impurities. However, in a comparable situation using an aqueous alcohol wash loss from the cake may be significant, indicating the removal of impurity. The color of the wash effluent and the loss from the filter cake are used in some of the following examples to evaluate the effectiveness of the washing procedure in the removal of impurities.

Following are examples of procedures for carrying out the invention, however their purpose is to illustrate and not limit the invention.

EXAMPLE 1

2,2'-dichlorohydrazobenzene was prepared by reducing 2300 pounds of ortho-nitrochlorobenzene and was dissolved in 1500 gallons of toluene. It was made to undergo the benzidine rearrangement by mixing with 875 gallons of 58° Bé. sulphuric acid under known conditions. When the conversion was complete the batch was heated until the 3,3'-dichlorobenzidine sulfate went into solution completely. The residual toluene was removed and the aqueous acid solution of the 3,3'-dichlorobenzidine sulfate was diluted with water to a total volume of 2500 gallons. 3700 pounds of common salt (sodium chloride) were added and dissolved in the solution, thereby causing the 3,3'-dichlorobenzidine hydrochloride to precipitate. The resulting slurry was filtered in a centrifuge and washed with 10 gallons of a 15% solution of isopropanol in water containing 5% of hydrogen chloride for each 100 pounds of cake. After the latter washing solution had been removed, the cake was washed with 6 gallons of 10% salt solution acidified with hydrochloric acid (per 100 pounds of cake). The purpose of the second wash was to remove the solvent from the cake. When the latter wash was completed the product was centrifuged dry and packaged. Control tests were carried out on unwashed material and on similar material thoroughly washed with only salt solution. The product which had been washed with the isopropanol solution showed no impurities on a chromatograph, whereas unwashed material and material thoroughly washed with salt water contained a considerable quantity of impurities as shown by the chromatograph.

EXAMPLE 2

Separation portions (50 gm. of wet cake each) of 3,3'-dichlorobenzidine hydrochloride prepared by the benzidine rearrangement process were washed in a succession of washing steps with 150 ml. of 18% aqueous sodium chloride containing 2% HCl for each wash. Each 50 gram portion of wet cake contained approximately 30 grams of 100% base. The same portion of 3,3'-dichlorobenzidine hydrochloride was then washed several times with a mixture of 15% isopropanol, 5% HCl and 80% water; using the same amount of washing liquid each time. Determinations of the percent loss during each wash were made. The percent loss for each washing cycle for run A, which had been obtained from one batch of 3,3'-dichlorobenzidine hydrochloride, and run B, which had been obtained from another batch of the same material, are presented in the following table:

| Wash No. | Salt Wash, Percent Loss | | | | IPA Wash, Percent Loss | | | | | |
|---|---|---|---|---|---|---|---|---|---|---|
| | 1 | 2 | 3 | 4 | 1 | 2 | 3 | 4 | 5 | 6 |
| Run A | .39 | .04 | .04 | .04 | 1.15 | .94 | .86 | .86 | | |
| Run B | .29 | .08 | .08 | .08 | 1.32 | 1.13 | 0.90 | 0.90 | 0.90 | 0.85 |

During the four washing cycles using the acid salt wash, the amount of material removed by the first acid salt wash portion is essentially due to amines already present in the cake; further washing with the same mixture removed substantially less material. However, on further washing with aqueous alcohol, a larger amount of material was lost in the first wash than in succeeding washes, indicating the removal of impurities. Moreover, the effluent of the first wash and succeeding washes in the salt washing cycles had little or no color whereas the several washing effluents from the aqueous alcohol wash and especially the first effluent had a marked color indicating the removal of substantial amounts of impurity which were not removed in the salt wash.

EXAMPLE 3

The procedure described in Example 2 was repeated using 3,3'-dianisidine hydrochloride, also prepared by the benzidine rearrangement, instead of 3,3'-dichlorobenzidine hydrochloride. The data on percent lost per washing cycle are presented in the table below:

| Wash No. | Salt Wash, Percent Loss | | | | IPA Wash, Percent Loss | | | | | |
|---|---|---|---|---|---|---|---|---|---|---|
| | 1 | 2 | 3 | 4 | 1 | 2 | 3 | 4 | 5 | 6 |
| | 0.4 | 0.1 | 0.07 | 0.07 | 1.3 | 1.0 | 1.0 | 0.96 | 0.96 | 0.9 |

The data indicate that again the salt wash removed little or no impurity, whereas the aqueous alcohol wash removed much larger quantities of impurity. The same conclusion was drawn from the color of the wash effluent withdrawn from the cake.

EXAMPLE 4

Using dichlorobenzidine hydrochloride from the same source prepared by the benzidine rearrangement, a series of washing tests were carried out using varying amounts of isopropanol, hydrochloric acid, sodium chloride and water. The percent loss of material and the product acceptability were noted and were recorded in the following table:

Composition of wash

| Test No. | Percent IPA | Percent HCl | Percent NaCl | Percent H$_2$O | Mls. Wash/ 50 g. Cake | Percent Loss | Product Acceptable |
|---|---|---|---|---|---|---|---|
| 1 | 0 | 2 | 18 | 80 | 150 | (¹) | No |
| 2 | 15 | 1 | 0 | 84 | 150 | 8.4 | Yes |
| 3 | 15 | 1.5 | 0 | 83.5 | 150 | 6.0 | Yes |
| 4 | 15 | 2 | 0 | 83 | 150 | 3.5 | Yes |
| 5 | 15 | 3 | 0 | 82 | 150 | 3.0 | Yes |
| 6 | 15 | 4 | 0 | 81 | 150 | 1.6 | Yes |
| 7 | 15 | 5 | 0 | 80 | 150 | 1.4 | Yes |
| 8 | 0 | 5 | 0 | 95 | 150 | 1.3 | No |
| 9 | 15 | 0 | 0 | 85 | 50 | 5.3 | ²No |
| 10 | 15 | 0 | 0 | 85 | 100 | 9.5 | Yes |
| 11 | 15 | 0 | 0 | 85 | 150 | 15.2 | Yes |

¹ Not determined but known to be very small.
² Approx. 65 mls. of wash/50 g. cake produces an acceptable product.

Tests 2 to 7, inclusive, produced acceptable products, but the procedure of test 7 would be preferred because the product loss was at a minimum. Tests 1 and 8 failed to produce an acceptable product because no alcohol was present. Tests 9, 10 and 11 show that the desired amount of purification may be produced by regulating the amount of aqueous alcohol employed.

EXAMPLE 5

3,3'-dichlorobenzidine hydrochloride from the same source in separate 50 gram portions was washed in separate experiments with aqueous isopropanol, aqueous acetic acid and aqueous acetone in concentrations ranging from 5 to 15% of the organic solvent. The concentration of hydrochloric acid was constant at 5% and the balance was water. In every case color was removed from the cake but could not be removed by an aqueous acidified salt solution. The percent loss for each wash ranged from about 1.3 to about 1.8 percent.

EXAMPLE 6

Benzidine hydrochloride from the same source prepared by the benzidine rearrangement, in separate 50 gram batches, was washed in 15% organic solvent, 5% hydrochloric acid and 80% water. The organic solvents used in separate tests were isopropanol, acetic acid and acetone. The percent loss ranged from 2.0 to 2.9 percent, and the wash effluent in each case contained a substantial amount of color which could not be removed from the cake by aqueous acid salt wash.

It is claimed:

1. The method of purifying impure mineral acid salts of a compound corresponding to the following formula:

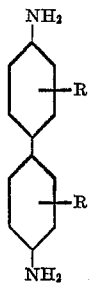

wherein R is a radical of the group consisting of hydrogen, an alkoxy group having 1 to 4 carbon atoms, chlorine and an alkyl group having 1 to 4 carbon atoms, which comprises washing them with an aqueous solution of an organic solvent having a solubility in water of at least 30 parts per 100 parts of water, the amount of organic solvent in the solution being at least 3 parts per 97 parts of water, and not more than about 50 parts of organic solvent per 50 parts of water said organic solvent being selected from the group consisting of low molecular weight alcohols having one to four carbon atoms, low molecular weight carboxylic acids having one to four carbon atoms, low molecular weight ketones and dioxane.

2. The method of claim 1 wherein the organic solvent is a member of the group consisting of acetone and alcohols having 1 to 4 carbon atoms.

3. The method of claim 1 wherein the compound is benzidine.

4. The method of claim 1 wherein the compound is a symmetrical dichloro ring substitution product of benzidine.

5. The method of claim 1 wherein the compound is a symmetrical dimethoxy ring substitution product of benzidine.

6. The method of claim 4 wherein the compound is symmetrical dichlorobenzidine.

7. The method of claim 4 wherein the compound is dianisidine.

8. The method of claim 1 wherein the washing material is acidified.

9. The method of claim 8 wherein the washing material is acidified with hydrochloric acid.

References Cited in the file of this patent

UNITED STATES PATENTS

| | | |
|---|---|---|
| 1,794,097 | Weiland et al. | Feb. 14, 1931 |
| 2,149,525 | Jenkins | Mar. 7, 1939 |
| 2,569,663 | Frank et al. | Oct. 2, 1951 |
| 2,587,861 | Krause | Mar. 4, 1952 |

OTHER REFERENCES

Bing: "J. Biol. Chem.," volume 95 (1932), page 388.

UNITED STATES PATENT OFFICE
CERTIFICATE OF CORRECTION

Patent No. 2,996,546                          August 15, 1961

Adnan A. R. Sayigh

It is hereby certified that error appears in the above numbered patent requiring correction and that the said Letters Patent should read as corrected below.

Column 3, line 61, for "Separation" read -- Separate --; column 6, line 26, for the claim reference numeral "4" read -- 5 --.

Signed and sealed this 26th day of December 1961.

(SEAL)
Attest:

ERNEST W. SWIDER                      DAVID L. LADD
Attesting Officer                      Commissioner of Patents

USCOMM-DC